US009302164B2

(12) United States Patent
Lamkin et al.

(10) Patent No.: US 9,302,164 B2
(45) Date of Patent: Apr. 5, 2016

(54) VARIABLY DISPOSED MULTI-LAYER GOLF GRIP (71) Applicant: Lamkin Corporation, San Diego, CA (US)

(72) Inventors: Robert J. Lamkin, San Diego, CA (US); Carl Pettersen, San Diego, CA (US); Denisse Camou, Tijuana (MX); Patricia Marquez, Tijuana (MX); Andrew Kerr, San Diego, CA (US); Carlos Martinez, San Diego, CA (US); Adam Colton, San Diego, CA (US); Peter Brown, San Diego, CA (US); Kerri Kauffman, San Diego, CA (US); Carlos Rodriguez, Tijuana (MX); Raul Medina, Tijuana (MX); Ricardo Medina, Tijuana (MX); Ting Lau, San Diego, CA (US); Steve Tallman, San Diego, CA (US); Jorge Gonzalez, Tijuana (MX); Mary Ramirez, Tijuana (MX)

(73) Assignee: Lamkin Corporation, San Diego, CA (US)

( * ) Notice: Subject to any disclaimer, the term of this patent is extended or adjusted under 35 U.S.C. 154(b) by 19 days.

(21) Appl. No.: 14/071,353

(22) Filed: Nov. 4, 2013

(65) Prior Publication Data

US 2015/0126299 A1 May 7, 2015

(51) Int. Cl.
*A63B 53/14* (2015.01)
*A63B 59/00* (2015.01)
*B29C 43/24* (2006.01)
*B29C 43/18* (2006.01)
*B29C 43/30* (2006.01)

(Continued)

(52) U.S. Cl.
CPC ............. *A63B 59/0029* (2013.01); *A63B 53/14* (2013.01); *A63B 60/14* (2015.10); *B29C 43/18* (2013.01); *B29C 43/24* (2013.01); *B29C 43/146* (2013.01); *B29C 43/305* (2013.01); *B29C 69/02* (2013.01); *B29C 2043/028* (2013.01); *B29K 2021/003* (2013.01); *B29K 2995/0021* (2013.01); *B29L 2009/00* (2013.01); *B29L 2031/5227* (2013.01)

(58) Field of Classification Search
CPC .... A63B 59/0029; A63B 53/14; A63B 60/14; B29C 43/24; B29C 43/18; B29C 43/305; B29C 43/146; B29C 69/02; B29C 2043/028; B29K 2995/0021; B29K 2021/003; B29L 2009/00; B29L 2031/5227
See application file for complete search history.

(56) References Cited

U.S. PATENT DOCUMENTS 2,046,164 A 6/1936 Herkner
2,115,119 A * 4/1938 Park .............................. 473/303

(Continued)

*Primary Examiner* — Stephen Blau
(74) *Attorney, Agent, or Firm* — Procopio, Cory, Hargreaves & Savitch LLP (57) ABSTRACT A golf grip for a golf club includes a cap, a body, a tip, and a grip surface. The body includes an under layer, a top layer, and a middle layer. The under layer includes a first color. The top layer includes a second color, different than the first color. The top layer is disposed on the under layer. The middle layer includes a third material. The middle layer is at least partially disposed between the under layer and the top layer. The tip is a portion of the under layer extending beyond the top layer and the middle layer. The grip surface extends between the cap and the tip. The grip surface is the radially outer surface of the body and includes the top layer, a plurality of exposed portions of the under layer, and a plurality of exposed portions of the middle layer.

12 Claims, 7 Drawing Sheets

(51) Int. Cl.
  *B29L 9/00* (2006.01)
  *B29L 31/52* (2006.01)
  *B29K 21/00* (2006.01)
  *B29C 43/14* (2006.01)
  *B29C 69/02* (2006.01)
  *B29C 43/02* (2006.01)

(56) References Cited

U.S. PATENT DOCUMENTS

| | | | | |
|---|---|---|---|---|
| 4,919,420 A | * | 4/1990 | Sato | 473/203 |
| 5,261,665 A | * | 11/1993 | Downey | 473/303 |
| 5,322,290 A | * | 6/1994 | Minami | 473/201 |
| 6,666,777 B1 | * | 12/2003 | Lamkin et al. | 473/300 |
| 6,723,006 B1 | | 4/2004 | Lin | |
| 7,008,582 B2 | * | 3/2006 | Chen | 264/132 |
| 7,163,466 B1 | * | 1/2007 | Downey | 473/300 |
| 7,374,498 B2 | * | 5/2008 | Huang | 473/302 |
| 7,566,375 B2 | * | 7/2009 | Huang | 156/63 |
| 8,323,433 B1 | | 12/2012 | Lowry et al. | |
| 2002/0107088 A1 | * | 8/2002 | Lamkin et al. | 473/300 |
| 2003/0139223 A1 | | 7/2003 | Ulrich et al. | |
| 2004/0224786 A1 | * | 11/2004 | Reardon | 473/300 |
| 2006/0089071 A1 | * | 4/2006 | Leidig | B29C 65/08 442/381 |
| 2006/0287123 A1 | * | 12/2006 | Wang | 473/300 |
| 2007/0072696 A1 | * | 3/2007 | Chen | 473/300 |
| 2013/0079174 A1 | * | 3/2013 | Gill et al. | 473/300 |

* cited by examiner

VARIABLY DISPOSED MULTI-LAYER GOLF GRIP

TECHNICAL FIELD

The present disclosure generally pertains to golf grips, and is also directed toward a golf grip including multiple colored layers variably disposed.

BACKGROUND

Grips for sporting implements such as golf clubs have taken numerous forms over the years. Early grips consisted of a wrap material, such as leather, in a helical pattern around the handle portion of the golf club. Over the years other materials such as polyurethane have been used as a wrap material.

Golf grips have evolved from the wrap type grip to a tapered cylinder of rubber, polyurethane, TPE, or similar elastomeric and shock absorbing materials that slip over the butt end of a golf club shaft.

One category of grips is the corded rubber grip. The corded rubber grip is traditionally manufactured by combining an under layer of rubber material, a second layer of soft cotton fibers, and a thin top layer of rubber. These layers are formed into a rubber sheet and die-cut into appropriate sizes to be put into a compression mold and formed into a final grip shape. After molding the cord is exposed by sanding or buffing the thin top layer. The under layer and the top layer are generally made from the same compound and made from the same color. The corded rubber grip generally provides extra traction and moisture wicking by the exposed cord.

SUMMARY OF THE DISCLOSURE

A golf grip for a golf club is disclosed. The golf grip includes a cap, a body, a tip, and a grip surface. The cap is a cylindrical shape. The body is a hollow cylinder shape adjacent the cap. The body includes an under layer, a top layer, and a middle layer. The under layer includes a first material and a first color. The top layer includes a second material and can be second color, different than the first color. The top layer disposed on the under layer. The middle layer includes a third material. The middle layer is at least partially disposed between the under layer and the top layer. The tip is a hollow cylinder shape adjacent the body, opposite the cap. The tip is a portion of the under layer extending beyond the top layer and the middle layer. The grip surface extends between the cap and the tip. The grip surface is the radially outer surface of the body and includes the top layer, a plurality of exposed portions of the under layer, and a plurality of exposed portions of the middle layer.

Other features and advantages of the present invention should be apparent from the following description which illustrates, by way of example, aspects of the invention.

DETAILED DESCRIPTION

The apparatus disclosed herein includes a golf grip with multiple colored layers variably exposed on the grip surface. In embodiments, the golf grip includes an under layer of a first color, a top layer of a second color, and a middle layer where portions of the top layer are buffed away revealing portions of the middle layer and the under layer along with the first color. In embodiments, the under layer extends axially beyond the middle layer and the top layer forming a single color tip that contrasts the body of the golf grip. The multiple colors variably exposed and the contrasting single color tip provide a unique aesthetic appearance for the golf grip.

Figure 1:
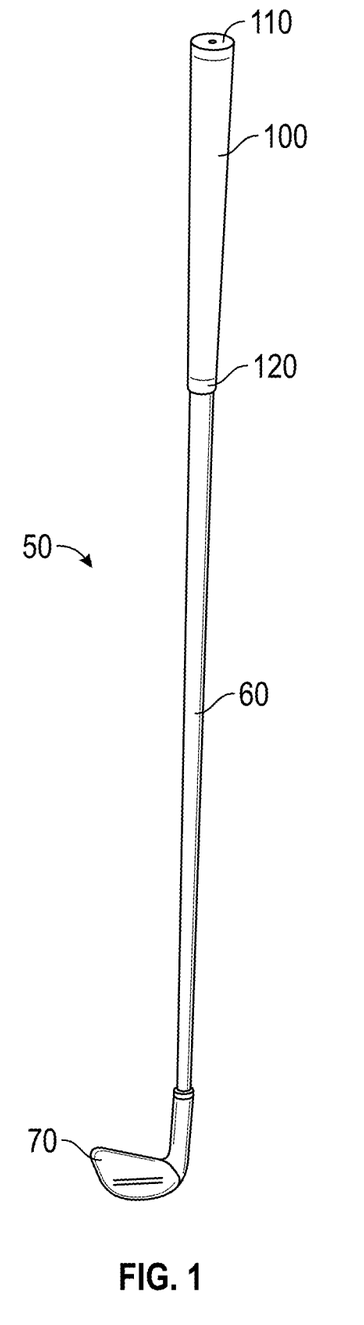
FIG. 1 is a perspective view of a golf club including a golf grip.

FIG. 1 is a perspective view of a golf club 50 with a golf grip ("grip") 100. Golf club 50 includes a shaft 60, a club head 70, and a golf grip such as grip 100. The shaft 60 may be a steel or graphite cylindrical tube. The length of shaft 60 is generally determined by the type of club head 70 attached and by the length of the measurement from the golfer's wrist to the floor. The club head 70 may be formed from any number of materials from processes such as forging and casting. Club head 70 may be any type of club head such as a driver, wood, hybrid, iron, or putter club head. Club head 70 is affixed to one end of shaft 60.

Grip 100 is affixed to the shaft 60 at the end distal to club head 70. Grip 100 includes a cap 110 and a tip 120. Grip 100 includes a cylindrical shape and is affixed to shaft 60 by inserting shaft 60 into the tip 120 of grip 100.

Figures 2, 3, 4:
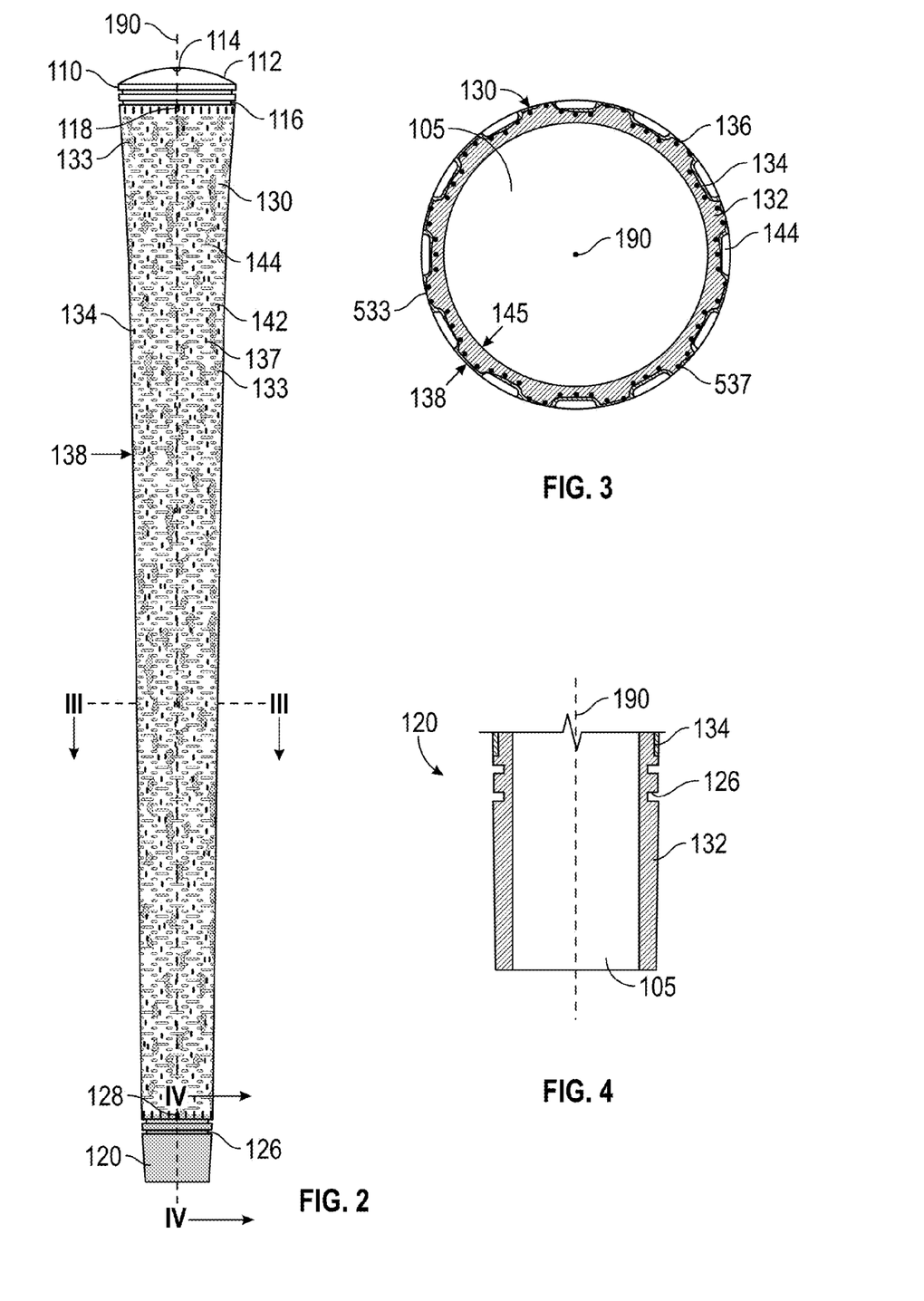
FIG. 2 is a plan view of an exemplary grip.
FIG. 3 is a cross-section of the grip taken along line III-III.
FIG. 4 is a cross-section of the grip taken along line IV-IV.

FIG. 2 is a plan view of an exemplary grip 100. Grip 100 includes axis 190. Axis 190 may be the axis of the cylindrical shape of grip 100. Grip 100 also includes a body 130 extending between the cap 110 and the tip 120. Body 130 may include the shape of a hollow cylinder or tube extending from cap 110 to tip 120. Body 130 includes grip surface 138, the outer surface of the cylindrical shape. Grip surface 138 extends between cap 110 and tip 120. Grip surface 138 may taper from cap 110 to tip 120 with the width or diameter of grip surface 138 getting progressively smaller from cap 110 to tip 120. The cross-section of body 130 may be a circle, an ellipse, a stadium shape, or other similar shapes.

FIG. 3 is a cross-section of grip 100 taken along line III-III. Body 130 includes under layer 132, top layer 134, and middle layer 136. In the preferred embodiment, each of these layers extends the length of body 130. In other embodiments, under layer 132, top layer 134, and middle layer 136, may be limited to defined sections of body 130. Under layer 132 is the radially inner layer of body 130. Under layer 132 contacts and is adjacent to shaft 60 when grip 100 is affixed to shaft 60 at inner surface 145. Under layer 132 is the thickest layer of body 130. Under layer 132 is formed from a first material. The first material for under layer 132 is a first color.

Top layer 134 is the radially outer layer of body 130, being located or disposed radially outward of under layer 132. Top layer 134 is thinner than under layer 132 and may be thinner than middle layer 136. Top layer 134 is formed from a second material. In some embodiments, the second material is the same as the first material, while in other embodiments, the second material is a different material than the first material. For example, the first material may be a more shock absorbent material, while the second material may be a softer and tackier material. In some embodiments, the second material for top layer 134 is a second color, different than first color. The second color may contrast the first color. In other embodiments, the second material may be the same color as the first material.

Middle layer 136 is located primarily radially between under layer 132 and top layer 134 or is at least partially disposed between the under layer and the top layer. Middle layer 136 is also thinner than under layer 132. The middle layer may be the first color, the second color, or a third color.

In the embodiment illustrated, middle layer 136 is a cord layer. In these embodiments, middle layer 136 includes fibers or cords. The fibers may be aligned parallel to axis 190. Each fiber may start adjacent cap 110 and end adjacent tip 120. The fibers may be spaced apart with portions of each fiber being at variable radial depths or variably disposed within under layer 132 and top layer 134. Under layer 132 or top layer 134 may fill or bleed into the spaces between the fibers.

In other embodiments, middle layer 136 is a rubber layer that is partially cured prior to being inserted between under layer 132 and top layer 134 during the manufacturing process. In these embodiments, middle layer 136 may be a solid piece of rubber, strips of rubber, or small pieces of rubber. In these embodiments, middle layer 136 is a third material. Another embodiment includes a middle layer 136 that is a thin rubber layer that contains a pre-determined content of short cord fibers in random orientation. This fiber filled rubber middle layer may be inserted between a top layer 134 and an under layer 132, each of which may or may not contain a content of short cord fibers. In some of these embodiments, the third material is the same as the first material. In others of these embodiments, the third material is the same as the second material. In yet others of these embodiments, the third material is different than both the first material and the second material.

In yet other embodiments, middle layer 136 is a foam material. The foam material may be a solid piece of material. The foam material may reduce the weight of the grip 100 and may improve the comfort of the grip 100.

FIG. 4 is a cross-section of grip 100 taken along line IV-IV. As illustrated in FIG. 4, a portion of under layer 132 extends from body 130 in the axial direction of axis 190 and away from cap 110, extending beyond middle layer 136 and top layer 134 to form tip 120. Tip 120 is formed integral to under layer 132 and includes the same material and the same color as the remainder of under layer 132. Tip 120 is formed into a single color tip. Tip 120 includes tip features 126. Tip features 126 may be aesthetic features such as trim rings extending around the circumference of tip 120. Tip features 126 may be painted a different color than the color of under layer 132, painting over the portions of the single color tip at tip features 126.

Figure 5:
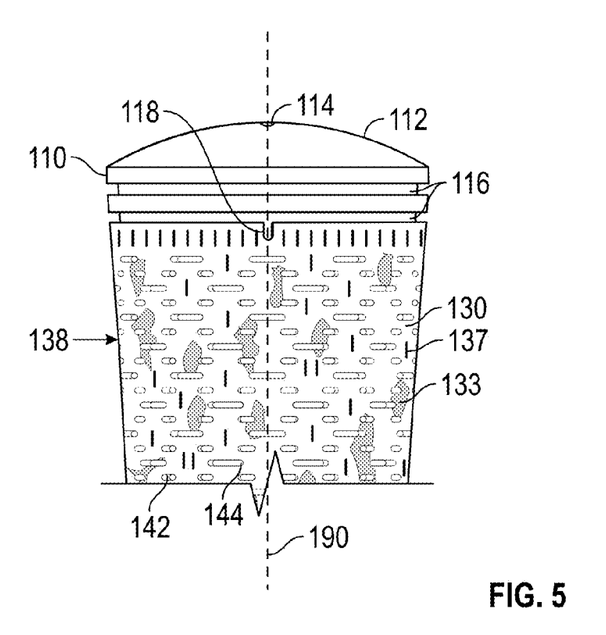
FIG. 5 is a portion of the plan view of the exemplary grip of FIG. 2 including the cap.

FIG. 5 is a portion of the plan view of the exemplary grip 100 of FIG. 2 including the cap 110. Cap 110 may include a solid cylinder shape. The end portion 112 of cap 110, distal to body 130 may be the shape of a flat disk or may be the shape of a spherical cap. Cap 110 may include a vent hole 114. Vent hole 114 extends through end portion 112 and may be used to insert compressed air during installation and removal of grip 100 from a golf club. Cap 110 may also include cap features 116. Cap features 116 may be aesthetic features such as trim rings extending around the circumference of cap 110. Cap features 116 may include a cap alignment feature 118. Cap alignment feature 118 may be a small indent or tick mark and may be aligned parallel to axis 190.

Cap 110 may be formed from one or more materials, which may be one or more colors. End portion 112 and cap features 116 may be formed from a material that is a different color than the remainder of cap 110 or may be painted a different color. In some embodiments, the color of end portion 112 and cap features 116 matches the color of under layer 132. Cap 110 may be formed from the first material, the second material, the third material, or a fourth material.

Figure 6:
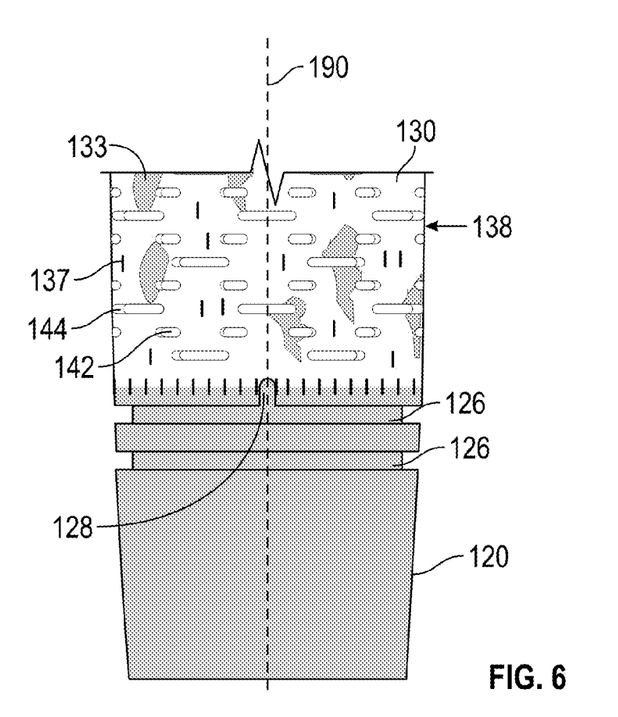
FIG. 6 is a portion of the plan view of the exemplary grip of FIG. 2 including the tip.

FIG. 6 is a portion of the plan view of the exemplary grip 100 of FIG. 2 including the tip 120. Tip 120 may include a hollow cylinder shape. Tip features 126 may include a tip alignment feature 128. Tip alignment feature 128 may be a small indent or tick mark and may be aligned with cap alignment feature 118 and parallel to axis 190.

Referring to FIGS. 2-6, body 130 includes gripping features such as narrow gripping features 142 and wide gripping features 144 extending into body 130 from grip surface 138. The gripping features are indents that are radially inward from grip surface 138. Narrow gripping features 142 are oriented with a short or narrow portion extending in the circumferential direction. Wide gripping features 144 are configured with a circumferential component oriented perpendicular to axis 190, elongated or configured to cross one or more cords. Portions of middle layer 136 and more particularly portions of cords of middle layer 136 that align with wide gripping features 144 may be located radially inward from wide gripping features 144 or may be located at the inner surface of wide gripping features 144 as illustrated in FIG. 3. The inner surface of wide gripping features 144 being the radially inner surface of wide gripping features 144. Portions of middle layer 136 and more particularly portions of cords of middle layer 136 may be displaced circumferentially from their pre-molded position such that portions of the cord may bend or curve around narrow gripping features 142 and may be located at or adjacent grip surface 138 while bending or curving around narrow gripping features 142.

Grip surface 138 includes top layer 134, portions of exposed middle layer 137, and portions of exposed under layer 133. The portions of exposed middle layer 137 are those portions of grip surface 138 where the top layer 134 has a thickness of zero or has been selectively removed to expose middle layer 136. The portions of exposed under layer 133 are those portion of grip surface where the top layer 134 and the middle layer 136 both have a thickness of zero, or where the top layer 134 has been selectively removed and the middle layer 136 has been removed, displaced, or where there are interstitial spaces between strips or cords or the middle layer 136.

The locations of the portions of exposed middle layer 137 and the portions of exposed under layer 133 may be variable due to the molding process described below. The locations of the portions of exposed middle layer 137 and the portions of exposed under layer 133 may be partially controlled by the placement of the gripping features that may modify the depths of top layer 134 and middle layer 136 and may modify the spacing between cords or strips of middle layer 136.

Referring to FIG. 3, grip 100 includes shaft cavity 105. Shaft cavity 105 is the hollow portion of grip 100 sized relative to the diameter of the shaft 60. Shaft cavity 105 extends through tip 120 and body 130 to cap 110. Shaft cavity 105 may be a right circular cylinder and is coaxial to axis 190. In some embodiments, shaft cavity 105 includes a small flat that is configured to create a rib on the outside of the grip.

The grip or one or more of the layers and cap of the grip may be made from rubber, polyurethane, TPE, or similar elastomeric and shock absorbing materials The middle layer may also be made from fibers such as cotton cord fibers, wool fibers, silk fibers, polypropylene fibers, cords, fabric, or cork. Additionally, fiber shaped elastomers, such as rubber, TPE, polyurethane, or other shock absorbing materials may be used. In even other embodiments, hydrophobic materials may be disposed as the middle layer to promote a dry surface even in wet playing conditions.

Figure 7:
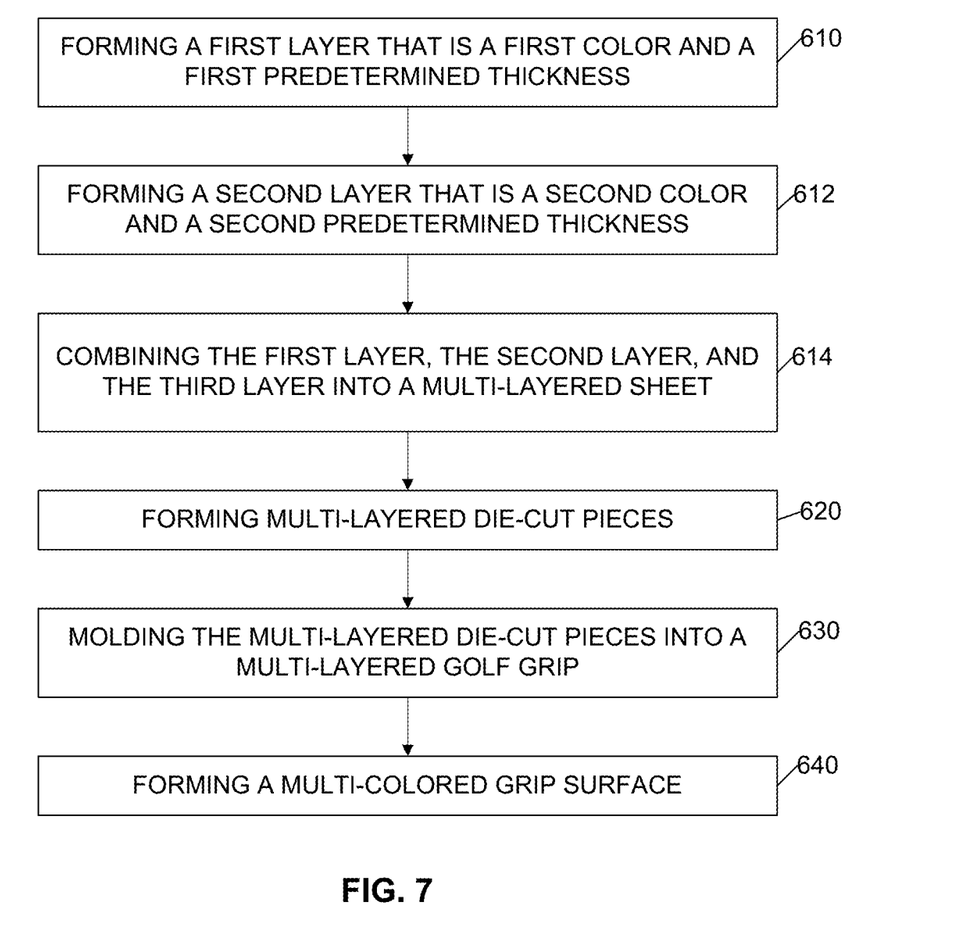
FIG. 7 is a flowchart of a method for manufacturing the grip of FIGS. 2-6.
Figure 8:
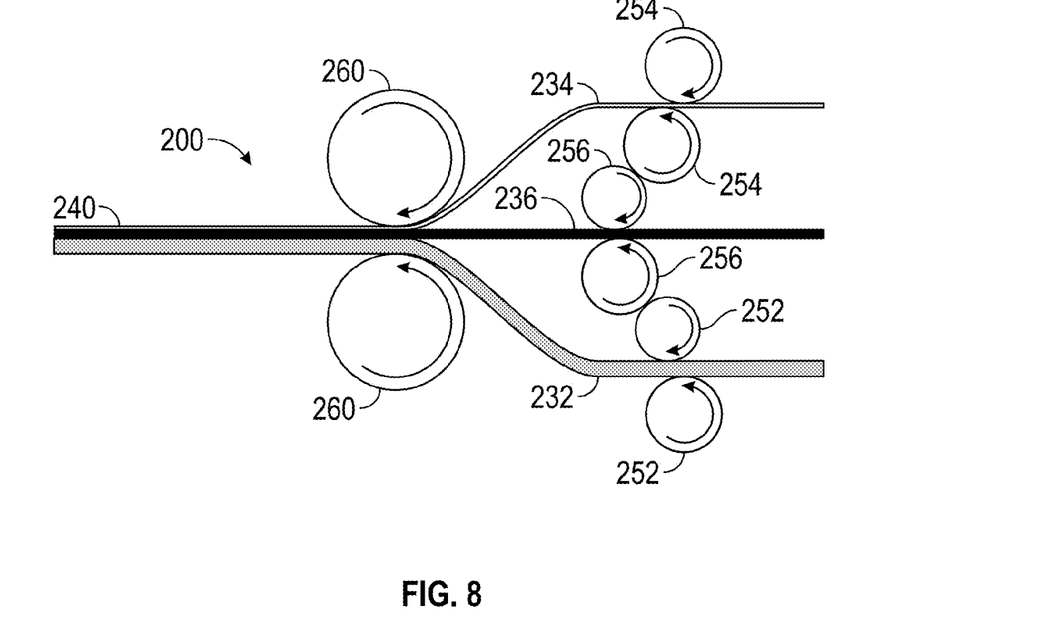
FIG. 8 is a side view of a calendering apparatus for preparing a multi-layered sheet.

FIG. 7 is a flowchart of a method for manufacturing the grip 100 of FIGS. 2-6. FIG. 8 is a side view of a calendering apparatus 200 for preparing a multi-layered sheet 240. The method includes forming a first layer 232 that is a first color and a first predetermined thickness at step 610. The first layer 232 is a first material. The method also includes forming a second layer 234 that is a second color and a second predetermined thickness at step 612. The second color is different than the first color and the second predetermined thickness is thinner than the first predetermined thickness. The second layer 234 is a second material.

Step 610 may include calendering the first layer 232 to the first predetermined thickness and step 612 may include calendering the second layer 234 to the second predetermined thickness. In the embodiment illustrated in FIG. 8, first layer 232 is passed through a first set of rollers 252 to calender first layer 232 to the first predetermined thickness, second layer 234 is passed through a second set of rollers 254 to calender second layer 234 to the second predetermined thickness. In other embodiments, first layer 232 and second layer 234 are calendered with a separate machine or process.

The first layer and the second layer may be formed to be a first color and a second color respectively. During the rubber compounding process, prior to the calendaring process, materials such as carbon black, silica, and pigments may be added while mixing the materials for each layer to give each layer its color.

The method further includes combining the first layer 232, the second layer 234, and a third layer 236 into a multi-layered sheet 240 with the third layer 236 being located between the first layer 232 and the second layer 234 at step 614. The third layer 236 is a third material. Step 614 may include calendering the third layer 236 between the first layer and the second layer. In the embodiment illustrated in FIG. 8, third layer 236 is passed through a third set of rollers 256 to feed third layer 236 between first layer 232 and second layer 234 as the first layer 232, the second layer 234, and the third layer 236 are directed towards the fourth set of rollers 260 to calender and form the multi-layer sheet 200.

Figure 9:
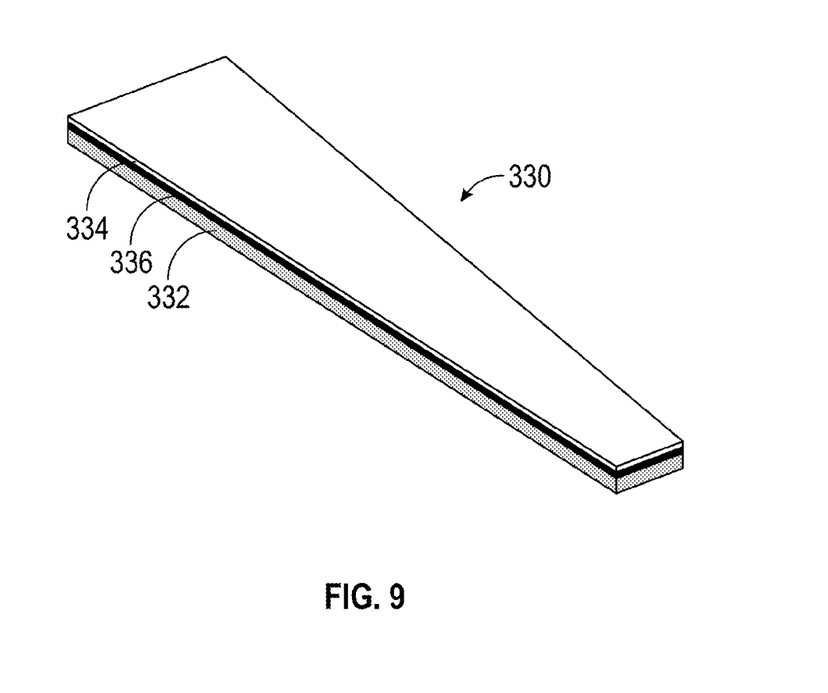
FIG. 9 is a perspective view of a die-cut piece.

The method also includes forming multi-layered die-cut pieces 330 at step 620. Forming multi-layered die-cut pieces 330 includes cutting predetermined shapes from multi-layered sheet 240. The length of each multi-layered die-cut piece 330 may be approximately the length of body 130 of grip 100. FIG. 9 is a perspective view of a multi-layered die-cut piece 330. In the embodiment illustrated in FIG. 9, multi-layered die-cut piece 330 is an isosceles trapezoid including a first die-cut layer 332, a second die-cut layer 334, and a third die-cut layer 336. As illustrated, the first die-cut layer 332 is an uncured rubber that is the first color, the second die-cut layer 334 is an uncured rubber that is the second color, and the third die-cut layer 336 includes cords extending between the bases of the isosceles trapezoid.

Figure 10:
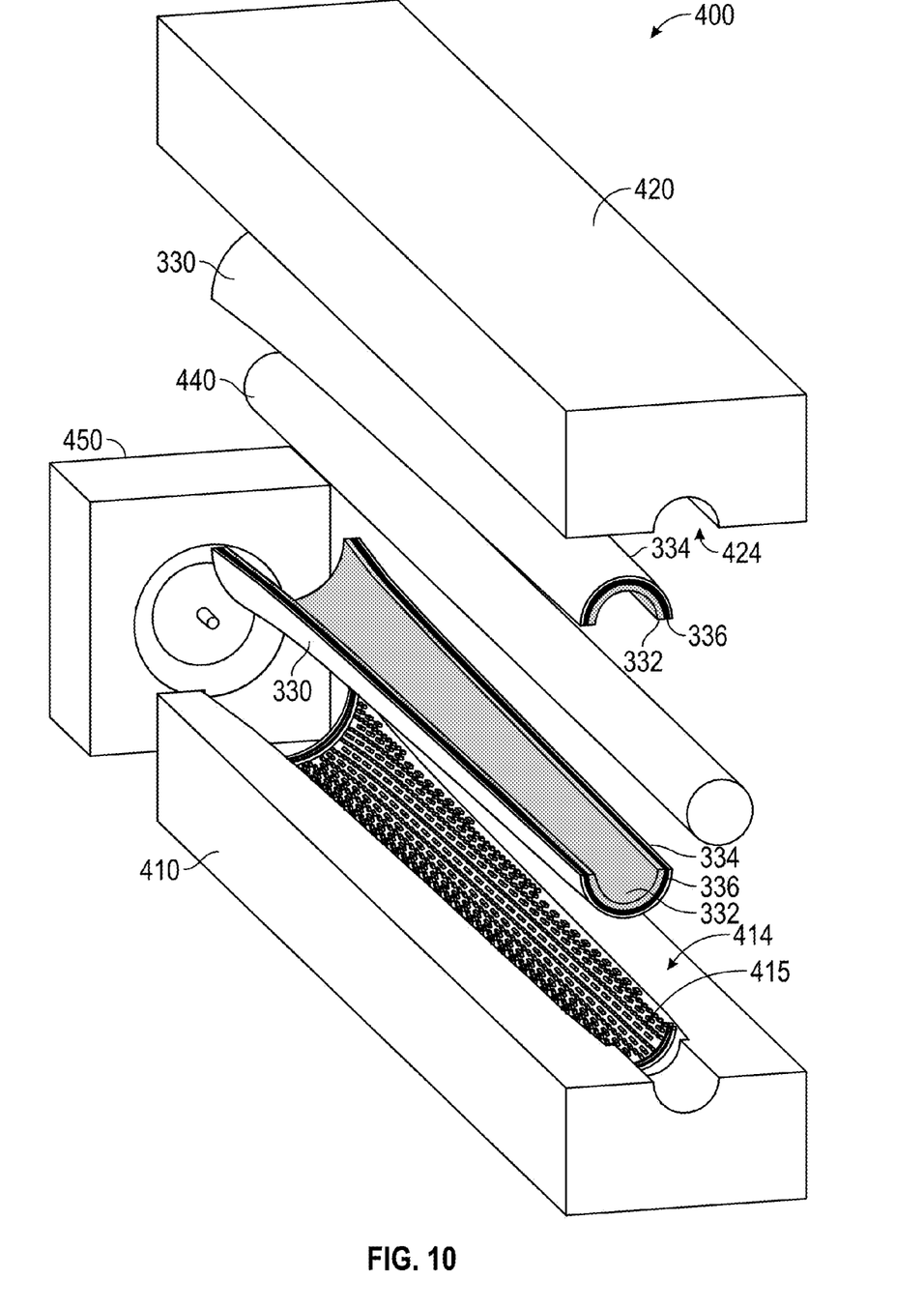
FIG. 10 is a perspective view of an exemplary mold used in manufacturing grip of FIGS. 2-6.

The method further includes molding multi-layered die-cut pieces 330 into a multi-layered golf grip at step 630. FIG. 10 is a perspective view of an exemplary mold 400 used in manufacturing grip 100 of FIGS. 2-6. As illustrated, mold 400 includes a bottom half 410 and a top half 420. Bottom half 410 and top half 420 may be connected by a hinge or by other methods for aligning bottom half 410 and top half 420 when the mold is closed. Bottom half 410 and top half 420 may be inserted into a larger assembly holding multiple molds 400 and includes the hinges or other alignment mechanisms. Each mold 400 may be removable from the larger assembly. Bottom half 410 includes a cavity 414 that is half of the outer shape of grip 100 and top half 420 includes a cavity 424 that is the other half of the outer shape of grip 100. Each of cavity 414 and cavity 424 include protrusions 415 the shape of the desired gripping features for grip 100.

Mold 400 also includes a core bar 440. Core bar 440 is cylindrical shaped with a radius approximately the size of shaft 60. Core bar 440 may also include a handle used for inserting and removing core bar 440. Core bar 440 provides the shape for shaft cavity 105. Mold 400 may also include an endpiece 450. Endpiece 450 may be adjacent to bottom half 410 and top half 420. Endpiece 450 may include a cap portion where a pre-molded cap may be inserted.

In the embodiment illustrated, one multi-layered die-cut piece 330 is placed into the bottom half 410 with the second die-cut layer 334 contacting cavity 414. The core bar 440 is then placed into mold 400 and onto the multi-layered die-cut piece 330 in contact with the first die-cut layer 332. A second multi-layered die-cut piece 330 is then placed on top of the core bar 440 with the first die-cut layer 332 contacting the core bar 440. The mold 400 is then closed with the cavity 424 contacting the second die-cut layer 334 of the multi-layered die-cut piece 330 located on top of the core bar 440.

Through the application of heat and pressure within the closed mold 400, the two multi-layered die-cut pieces 330 are molded and joined together to form the grip 100. In other embodiments, more than two panels are used to insert different colors and shapes into the grip 100. For example, when grip 100 is a putter grip, more than five panels may be used to form the final shape of the grip 100. In some embodiments, each first die-cut layer 332 may be a different color, each second die-cut layer 334 may be a different color, and each third die-cut layer 336 may be a different color.

A portion of the first die-cut layer 332 flows away from the cap 110 and forms tip 120. The third die-cut layer 336, being either cord or a pre-cured material does not flow with the first die-cut layer 332 to form tip 120 and prevents the second die-cut layer 334 from flowing with first die-cut layer 332 to form tip 120. The cured first die-cut layer 332 forms under layer 132 including the first color, the cured second die-cut layer 334 forms top layer 134 including the second color, and the third die-cut layer 336 forms middle layer 136.

During the molding process, the first die-cut layer 332 and the second die-cut layer 334 may flow between the cords or strips of third die-cut layer 336 and the protrusions 415 of the tooling may displace portions of the first die-cut layer 332, portions of the second die-cut layer 334 and portions of the third die-cut layer 336, forming a top layer 134 and an under layer 132 of variable thicknesses and a middle layer of variable depths, being variably disposed in the under layer 132 and the top layer 134.

Molding the multi-layered die-cut pieces 330 into a multi-layered golf grip may include forming a pre-molded cap. The pre-molded cap may be formed by placing rubber into a pre-form mold cavity and heating the rubber under pressure until it is partially cured. The pre-molded cap is partially cured so as to hold its shape and prevent excess bleeding between the pre-molded cap and the multi-layered die-cut pieces 330 while forming grip 100. The pre-molded cap may include a pre-molded cap body, a pre-molded end portion, and a pre-molded inner portion. The pre-molded cap body includes a cylindrical shape. The pre-molded end portion may include the shape of a flat disk or the shape of a spherical cap. Pre-molded inner portion may also include a cylindrical shape located adjacent the pre-molded cap body, opposite the pre-molded end portion, with a smaller radius than the cylindrical shape of pre-molded cap body. The pre-molded cap is placed adjacent the multi-layered die-cut piece 330 in adjacent the endpiece 450 and the core bar 440 is placed into the mold adjacent the pre-molded cap. The pre-molded cap is then molded with the multi-layered die-cut pieces 330 into the grip 100.

The method further includes forming a multi-colored grip surface at step 640, including selectively removing portions of top layer 134 to create or expose the portions of exposed under layer 133 and the portions of exposed middle layer 137. Selectively removing portions of top layer 134 may include buffing or sanding the grip 100. Other methods of removing material from the top layer 134 of the molded grip 100 may include lathe machining, grinding, milling, segmented turning, or any other form of reduction machining that suits the final shape. The portions of exposed under layer 133 and portions of exposed middle layer 137 creates a unique cosmetic appearance of a multi-color distressed look by combining the colors from top layer 134, middle layer 136, and under layer 132 at grip surface 138.

The tip 120 being formed of the under layer 132 and the first color provides an aesthetically pleasing contrast to the body 130 that may primarily include the top layer 134 of the second color along with the portions of exposed under layer 133 and the portions of exposed middle layer 137 may also create a or add to the unique cosmetic appearance of the multi-color grip prior to any addition of paint or other types of additional coloring.

In addition to the aesthetic improvements, an under layer being a color that is different than the color of the top layer may allow a manufacturing operator to visually know how much of the top layer has been removed and more accurately expose the cord layer, or create varying densities or textures on different areas of the grip surface 138. The varying densities and textures at the grip surface may help a golfer retain the golf club securely in the golfer's hand by improving the traction or friction between the grip and the golfer's hand.

Figure 11:
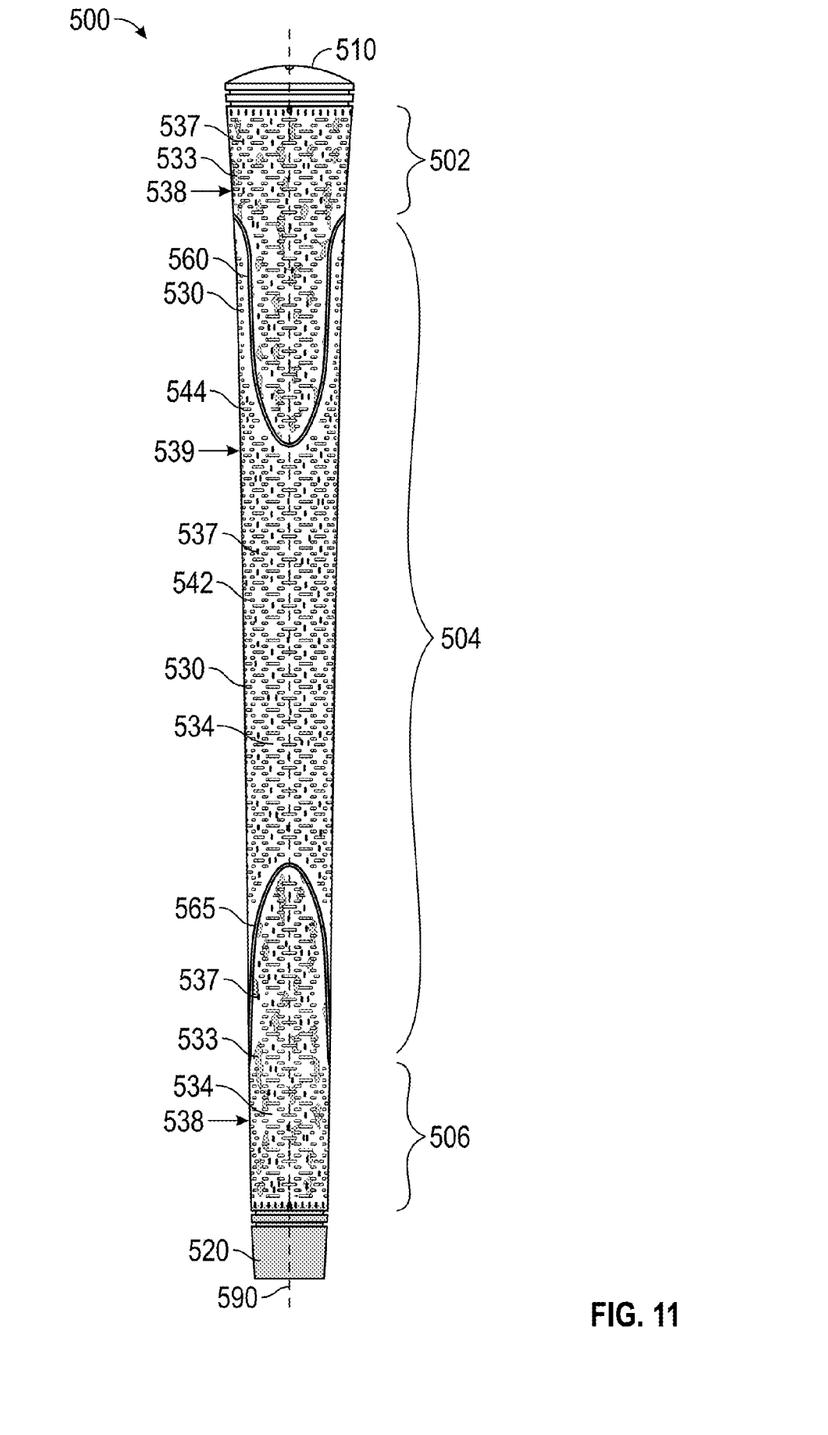
FIG. 11 is a plan view of an exemplary grip formed from multiple panels.

FIG. 11 is a plan view of an exemplary grip 500 formed from multiple panels. Grip 500 includes multiple sections. Each section may be made from different panels or compounds. The embodiment shown in FIG. 11 includes three sections, first section 502, second section 504, and third section 506. In the embodiment illustrated, first section 502 is made of a multi-layered die cut piece similar to that of FIG. 9 with a first die-cut layer that is an uncured rubber of a first color, a second die-cut layer that is an uncured rubber of a second color, and the third die-cut layer that includes cords. The shape of this multilayered die cut piece is determined by the desired pattern for the grip 500. The second section 504 may be made of a second die cut piece or panel that is different than the first section 502. The panel of the second section 504 may include a first layer and a second layer of the same color. This color may match the first or the second color. The panel for the second section 504 may be partially cured prior to being molded with the first section 502 and the third section 506. The third section 506 may also be made of a multilayered die cut piece similar to that of FIG. 9. The layers of the third section 506 may match those of the first section 502, or may be different, contrasting colors.

The sections may be divided by a dividing line. Each dividing line may be straight or curved. Each dividing line may recede into or protrude out from body 530. In the embodiment shown in FIG. 11, first section 502 and second section 504 are divided by first dividing line 560, and second section 504 and third section 506 are divided by second dividing line 565; first dividing line 560 and second dividing line 565 are sinusoidal slots.

As illustrated in FIG. 11, the body 530 if grip 500 also includes gripping features such as narrow gripping features 542 and wide gripping features 544 extending into body 530. Narrow gripping features 542 and wide gripping features 544 may be configured and oriented relative to axis 590 in the same or a similar manner as those described in relation to FIGS. 2-6.

As illustrated, the first section 502 and the third section 506 include a grip surface 538 that includes top layer 534, portions of exposed middle layer 537, and portions of exposed under layer 533. The portions of exposed middle layer 537 are those portions of grip surface 538 where the top layer 534 has a thickness of zero or has been selectively removed to expose the middle layer. The portions of exposed under layer 533 are those portion of grip surface 538 where the top layer 534 and the middle layer both have a thickness of zero, or where the top layer 534 has been selectively removed and the middle layer has been removed, displaced, or where there are interstitial spaces between strips or cords or the middle layer.

The locations of the portions of exposed middle layer 537 and the portions of exposed under layer 533 may be variable due to the molding process described above. The locations of the portions of exposed middle layer 537 and the portions of exposed under layer 533 may be partially controlled by the placement of the gripping features that may modify the depths of top layer 534 and the middle layer and may modify the spacing between cords or strips of middle layer.

As illustrated, the second section 504 includes a grip surface 539 with a top layer 534 and portions of exposed middle layer 537. In this embodiment, second section 504 does not include the contrasting portions of exposed under layer 533. In other embodiments, the second section 504 may not include the portions of exposed middle layer 537 and may include the portions of exposed under layer 533.

The method for forming grip 500 may be the same or similar to that of the method described in conjunction with FIG. 7.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art.

What is claimed is:

1. A golf grip for a golf club comprising:
   a cap with a cylindrical shape;
   a body with a hollow cylinder shape adjacent the cap, the body including
      an under layer including a first material and a first color,
      a top layer including a second material and a second color, different than the first color, the top layer being disposed on the under layer, and
      a middle layer including a third material and a third color, different than the first color and the second color, the middle layer being at least partially disposed between the under layer and the top layer;

a tip with a hollow cylinder shape, the tip being a portion of the under layer extending beyond the top layer and the middle layer opposite the cap; and a grip surface extending between the cap and the tip, the grip surface being the radially outer surface of the body and including the top layer, a plurality of exposed portions of the under layer of the first color, and a plurality of exposed portions of the middle layer.

2. The golf grip of claim 1, wherein the third material includes cord.

3. The golf grip of claim 2, wherein the body includes a plurality of gripping features, each gripping feature is an indent radially inward from the grip surface, and wherein a portion of the cord aligned with one of the plurality of gripping features is located radially inward of the one of the plurality of gripping features.

4. The golf grip of claim 1, wherein the third material includes foam.

5. The golf grip of claim 1, wherein the third material includes rubber.

6. The golf grip of claim 1, wherein the second material is the same material as the first material.

7. The golf grip of claim 1, wherein the first material and the second material include rubber.

8. The golf grip of claim 1, wherein the tip includes a tip feature extending circumferentially about the tip, and wherein the tip feature is painted a different color than the first color.

9. A golf grip for a golf club comprising:
an under layer including a first rubber material, the under layer being a first color;

a top layer including a second rubber material, the top layer being a second color, different than the first color, and being disposed outward from the under layer and thinner than the under layer; and a cord layer including a cord material of a third color different than the first color and the second color, the cord layer including multiple cords being variably disposed in the top layer and the under layer, the under layer, the top layer, and the cord layer forming a body; and a grip surface extending along the body and being the outer surface of the body, the grip surface including the top layer, a plurality of exposed portions of the under layer, and a plurality of exposed portions of the cord layer;

wherein a portion of the under layer extends beyond the top layer and the cord layer forming a tip.

10. The golf grip of claim 9, wherein the second rubber material is the same material as the first rubber material.

11. The golf grip of claim 9, further comprising:
a plurality of gripping features, each gripping feature extending inward from the grip surface, wherein some of the plurality of gripping features are configured to cross a portion of one of the multiple cords of the cord layer;

wherein each portion of the cord layer that is crossed by one of the plurality of gripping features is located inward of the plurality of gripping features.

12. The golf grip of claim 9, wherein the tip includes a tip feature extending about the tip, and wherein the tip feature is painted a different color than the first color.

* * * * *